(12) United States Patent
Evans

(10) Patent No.: US 6,675,577 B2
(45) Date of Patent: Jan. 13, 2004

(54) ANTI-STALL TRANSMISSION CONTROL FOR UTILITY VEHICLE

(75) Inventor: Mark David Evans, Grovetown, GA (US)

(73) Assignee: Deere & Company, Moline, IL (US)

( * ) Notice: Subject to any disclaimer, the term of this patent is extended or adjusted under 35 U.S.C. 154(b) by 131 days.

(21) Appl. No.: 09/905,276

(22) Filed: Jul. 13, 2001

(65) Prior Publication Data

US 2003/0010025 A1 Jan. 16, 2003

(51) Int. Cl.⁷ ................................................. F16D 31/02
(52) U.S. Cl. .............................. 60/445; 60/327; 60/449
(58) Field of Search ........................... 60/431, 368, 327, 60/445–449

(56) References Cited

U.S. PATENT DOCUMENTS

| | | | |
|---|---|---|---|
| 4,180,979 A | * | 1/1980 | Cornell .......................... 60/431 |
| 4,282,711 A | | 8/1981 | Branstetter |
| 4,448,021 A | * | 5/1984 | Hawkins ....................... 60/449 |
| 4,455,770 A | * | 6/1984 | Presley ........................ 60/449 |
| 4,648,803 A | | 3/1987 | Stephenson et al. |
| 5,525,043 A | * | 6/1996 | Lukich .......................... 60/431 |
| 5,560,203 A | | 10/1996 | Pollman |
| 5,576,962 A | * | 11/1996 | Ferguson et al. ............. 60/431 |
| 5,703,345 A | | 12/1997 | Gollner et al. |
| 6,002,976 A | | 12/1999 | Hollstein et al. |
| 6,010,309 A | * | 1/2000 | Takamura et al. ............ 60/449 |
| 6,022,292 A | | 2/2000 | Goodnight |
| 6,202,783 B1 | | 3/2001 | Taylor et al. |
| 6,385,970 B1 | * | 5/2002 | Kuras et al. .................. 60/448 |

OTHER PUBLICATIONS

Nichols, Herbert L. Jr., Moving the Earth, 1976, title pages, pp. 12–74, 12–75 (4 pages).
John Deere Brochure: "700H" Crawler.

* cited by examiner

Primary Examiner—Edward K. Look
Assistant Examiner—Igor Kershteyn
(74) Attorney, Agent, or Firm—Polit & Ericson, LLC

(57) ABSTRACT

A control system for a utility vehicle, particularly a compact utility tractor, that is speed-controlled by a hydrostatic transmission, prevents engine stalling by automatically reducing the stroke of a pump of the hydrostatic transmission, and thus reducing the vehicle speed, when the unloaded engine speed drops below a predetermined threshold. The apparatus includes a servo controlled hydrostatic transmission, an engine speed sensor, a throttle position sensor and a controller. The unloaded engine speed is determined by either an engine throttle lever position or by an engine speed capture algorithm that continuously monitors engine speed and records engine speed occurring when the transmission control pedals are positioned in neutral.

11 Claims, 6 Drawing Sheets

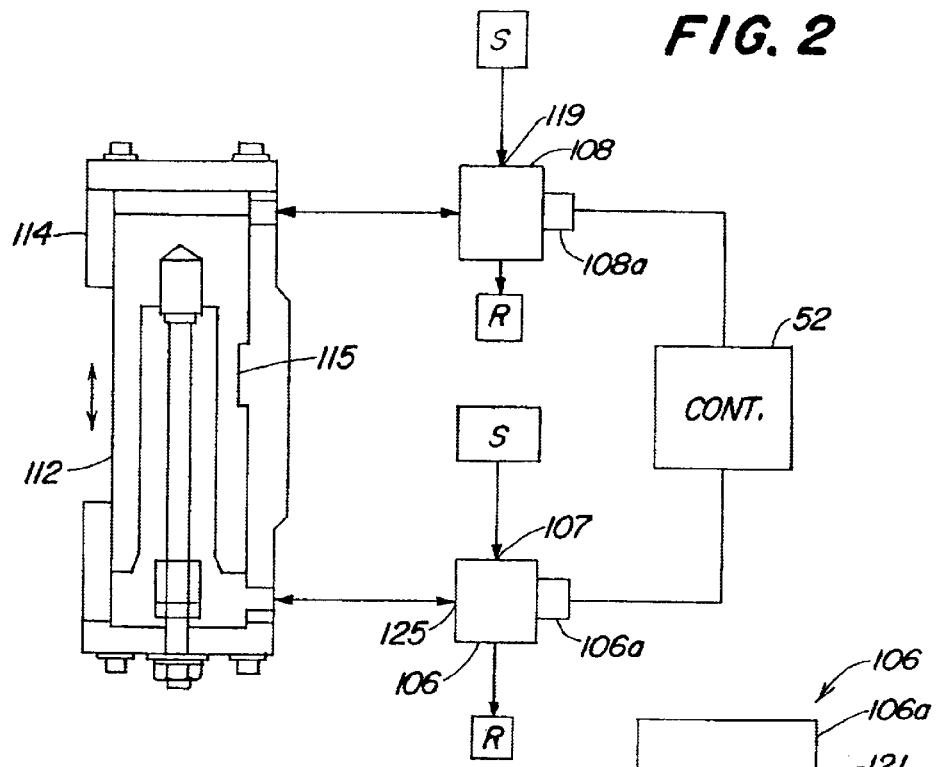
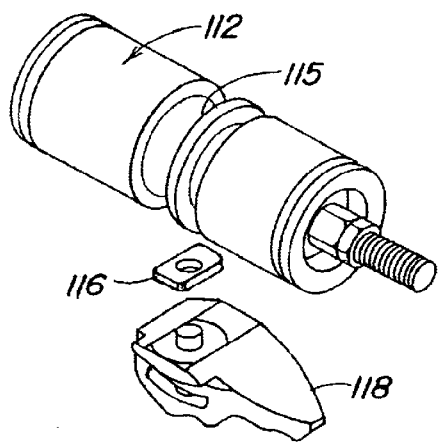
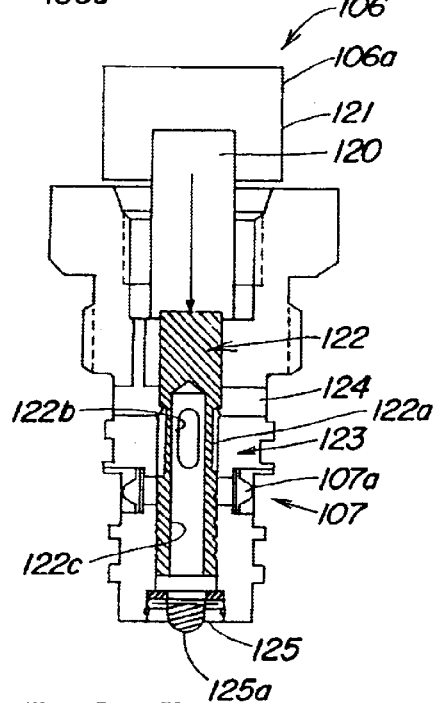
FIG. 2
FIG. 3
FIG. 3a

ANTI-STALL TRANSMISSION CONTROL FOR UTILITY VEHICLE

TECHNICAL FIELD OF THE INVENTION

The invention relates to vehicles for industrial and agricultural use, such as utility tractors. Particularly, the invention relates to engine anti-stall transmission control of a utility vehicle that incorporates a hydrostatic transmission as an operator-controlled speed-adjusting component of the vehicle drive train.

BACKGROUND OF THE INVENTION

Compact utility tractors having hydrostatic transmissions are commonly purchased by customers that are not experienced tractor operators and are used for jobs, such as material handling with a front loader, that subject the tractor to sudden load application. With inexperienced drivers, engine stall may occur, leading to operator frustration and a perception that the tractor lacks sufficient engine power. This problem is exacerbated with foot pedal control of the hydrostatic transmission because in order to prevent engine stalling, the operator must actually reduce the pedal actuation, to decrease the stroke of the hydrostatic pump. This however is contrary to the action usually applied to foot pedal accelerators in cars and trucks to prevent engine stalling under load.

SUMMARY OF THE INVENTION

The invention provides an apparatus and method to prevent engine stalling, in a utility vehicle having a hydrostatic transmission, by automatically reducing the stroke of the hydrostatic transmission pump, and thus the vehicle speed, when engine speed drops below a predetermined threshold.

The apparatus and methods of the invention effectively prevent engine stall in a tractor having hydrostatic transmission speed control. The apparatus and methods can prevent engine stall when the vehicle is operating in either forward or reverse direction.

The apparatus includes a hydrostatic transmission, an engine speed sensor, a throttle position sensor and a controller, such as a microcontroller. A servo piston operating against a centering spring is moved to adjust the capacity of the pump in the hydrostatic transmission. The position of the servo piston is controlled by electro-hydraulic proportional pressure reducing valves that modulate the pressure applied to the servo piston. In normal vehicle operation, the operator depresses a foot pedal. A potentiometer senses the position of the foot pedal and sends a voltage signal to the controller. The controller software calculates a command current from the signal and drives the pressure reducing valves with the current. The greater the current, the greater the pump stroke and the faster the tractor wheels are turned.

As the tractor comes under load, the engine speed begins to drop. The microcontroller software continuously monitors the engine speed from a pulse pickup unit, and compares the engine speed to the estimated unloaded engine speed which is based on the position of the throttle lever as measured by the throttle position sensor. The engine speed is allowed to drop an amount specified by a software parameter. When the engine speed drop exceeds a threshold, then the microcontroller responds by reducing the current command to the pressure reducing valves, thus reducing the pump capacity and the tractor wheel speed. The amount of current reduction is calculated using a PID algorithm using the error between the unloaded speed, estimated from the throttle position sensor, and the actual engine speed.

As a further aspect of the invention, a method is provided for reducing the cost of implementing engine stall prevention in utility vehicles. The inventive system eliminates the need for a throttle position sensor, thus reducing the overall cost of the system.

The further aspect of the invention establishes a method for predicting the unloaded engine speed for anti-stall control from a measurement of engine speed while the transmission controls of the vehicle are in a neutral position.

The further aspect of the invention uses an engine speed sensor such as a pulse pickup unit, speed control foot pedals or other manual direction control, and a microcontroller with software. The software monitors the engine speed and the foot pedal speed controls continuously. When the foot pedals are in neutral, i.e., neither the forward or the reverse pedal is depressed, and the vehicle is not moving, the software captures and stores the engine speed in a microcontroller memory. This is an accurate estimate of the unloaded engine speed. As the operator commands the vehicle into motion, the engine speed will drop depending on the level of load. When the engine speed drop exceeds a specified value compared to the unloaded engine speed, a control command is sent from the microcontroller to the transmission to reduce the vehicle speed proportional to the amount of engine drop, and thus the power required. When the driver changes direction via foot pedal, the engine speed recovers rapidly, thus permitting an updated measurement of unloaded engine speed to be captured by the microcontroller memory.

This process works best when the engine throttle position is left unchanged during vehicle operation, but does work successfully if the operator changes throttle position while the vehicle is not moving.

This further aspect of the invention is particularly applicable to vehicle operations that involve regular changes in direction, such as moving materials with a front-end loader. Because the driver regularly shifts the transmission through neutral when changing direction, the microcontroller can regularly and accurately update its measurement of the unloaded engine speed without the need for a throttle position sensor. This further aspect of the invention permits engine stall prevention to be implemented at a reduced cost.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 2 is a schematic sectional view of the servo control system used in a hydrostatic transmission of FIG. 1;

FIG. 3 is an exploded, fragmentary perspective view of the servo control system of FIG. 2;

FIG. 3A is a schematic sectional view of a proportional pressure reducing valve of the system of FIG. 3;

DETAILED DESCRIPTION OF THE PREFERRED EMBODIMENTS

Figure 1:
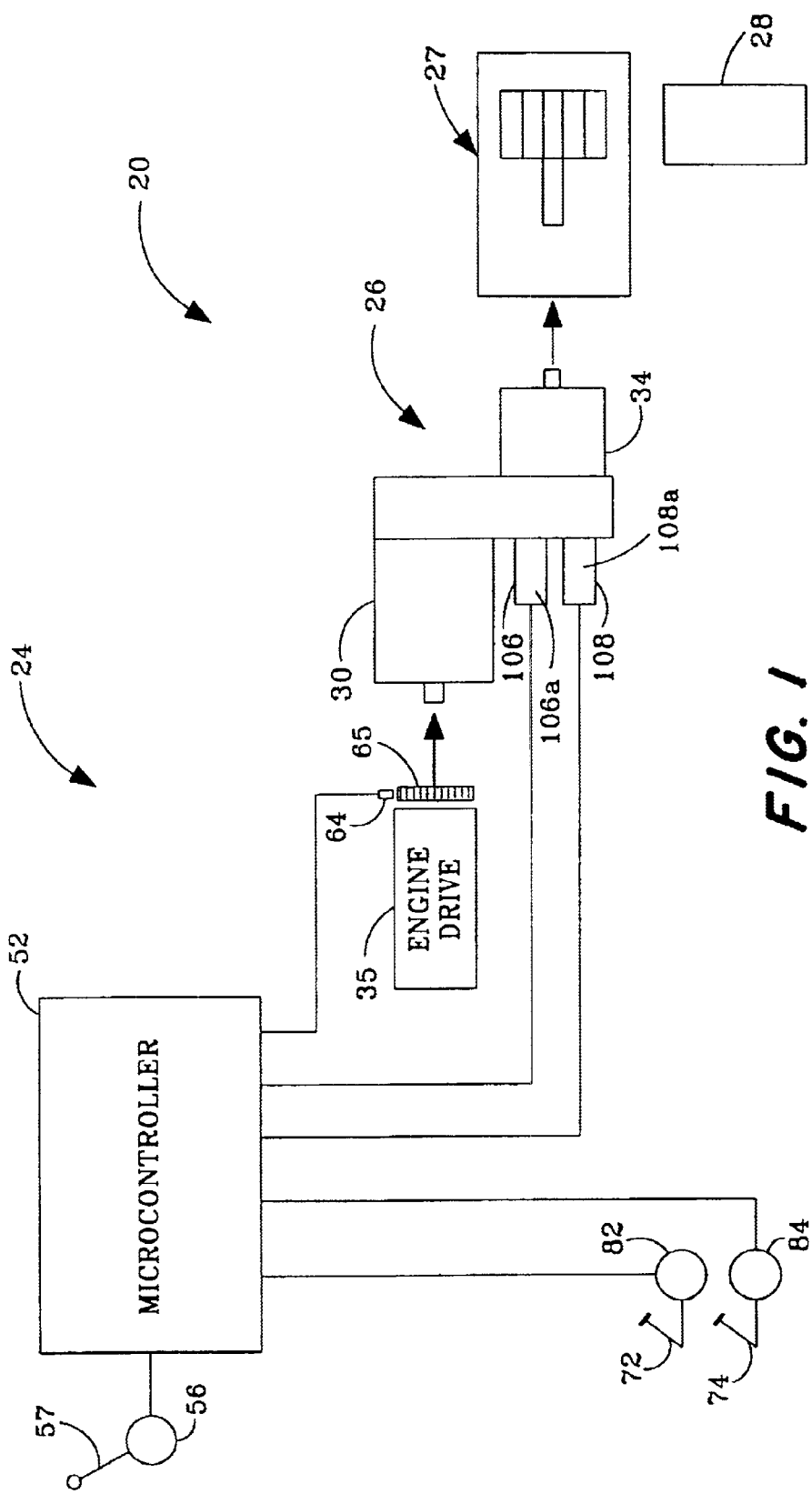
FIG. 1 is a block diagram of the method of the utility vehicle speed control system of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates in block diagram form, a vehicle 20 incorporating a preferred embodiment speed control system 24 of the present invention. The vehicle incorporates a hydrostatic transmission 26 and a range transmission 27, such as a multi-speed gear transmission for transmitting power through a differential (not shown) to one or more driven wheels 28.

The hydrostatic transmission 26 includes a variable displacement pump 30, and a hydraulic motor 34. An engine 35 rotationally drives the variable displacement pump 30. The hydraulic motor drives the multi-gear transmission drive 27 interposed between the hydraulic motor 34 and the driven wheel 28.

The control system 24 includes a controller 52, such as a microprocessor-based microcontroller, in signal-communication with an engine throttle position sensor 56 connected to an engine throttle lever 57. The microcontroller 52 is also in signal-communication with an engine speed sensor 64 located in close proximity to a rotating part of the engine 35, such as rotating teeth or targets on the engine flywheel 65. Preferably, the sensor 64 is a Hall effect sensor. The sensor 64 is configured to either send a speed signal to the microcontroller or to send a stream of pulses to the microcontroller, or to an associated component, wherein the microcontroller correlates engine speed to the frequency of the pulses.

The control system 24 includes a forward pedal 72, and a reverse pedal 74. The forward pedal 72 is operatively engaged with a potentiometer 82 to produce a forward pedal position signal, and a reverse pedal 74 is operatively engaged with a potentiometer 84 to produce a reverse pedal position signal. The potentiometers 82, 84 are signal-connected to the controller 52.

The controller 52 is signal-connected, through appropriate signal conditioning or amplifying circuitry (not shown), to a solenoid 106a of a forward drive proportional control valve 106, and to a solenoid 108a of a reverse drive proportional control valve 108. The output current to energize the forward or reverse control valve solenoids 106a, 108a is substantially proportional to the corresponding pedal position signal.

FIGS. 2 and 3 illustrate the hydrostatic transmission servo control in more detail. Given an engine drive speed and a range transmission or final drive gear selection, the hydrostatic transmission provides infinitely variable speed control, forward and reverse, by operation of the foot pedals 72, 74. Each valve 106, 108 is connected to a source of pressurized hydraulic fluid S and a return channel R that is at a reduced hydraulic pressure. Preferably, the return channel R recirculates hydraulic fluid back to hydraulic reservoir of the vehicle.

Depressing the forward foot pedal 72 causes an electrical output signal or voltage of the potentiometer 82 to be transmitted to the controller 52. The controller 52, through software, generates a pre-selected current ramp output, to energize the solenoid 106a of the forward drive proportional valve 106. The proportional valve 106 is opened according to the ramp output, allowing pressurized hydraulic fluid, fed from the source S into the inlet 107 of the valve 106, to flow through the valve 106. The pressurized hydraulic fluid is communicated into, and pressurizes, a servo cylinder 114 on one side of a servo piston 112 that is slidably housed in the cylinder 114. The other valve 108 allows fluid to flow from within the cylinder 114, from an opposite side of the servo piston 112, to the return channel R.

The piston 112 has a notch 115 that holds a piston follower 116 (FIG. 3). The piston follower 116 controls movement of a variable displacement pump cam plate or swashplate 118. Movement of the piston 112 causes the swashplate 118 in the hydraulic pump to rotate out of the neutral position. Maximum displacement of the pump 30 is attained when the servo piston 112 is moved to its extreme position. The swashplate 118 can be positioned in a range of positions selected by the forward foot pedal 72.

When the reverse pedal 74 is pressed, the potentiometer 84 sends an electrical output signal or voltage to the controller 52. The controller 52, through software, generates a pre-selected current output ramp to energize the solenoid driver 108a of the reverse drive proportional valve 108. The reverse drive proportional valve 108 is opened, according to the ramp output, to allow pressurized hydraulic fluid, fed into an inlet 119 of the valve 108 from the source S, to flow through the valve 108. The pressurized hydraulic fluid is communicated into, and pressurizes the servo cylinder 114 on an opposite side of the servo piston 112 within the cylinder 114. The other valve 106 is allows fluid to flow from within the cylinder 114, from the one side of the servo piston 112, to the return channel R.

Preferably, the valve solenoids 106a, 108a are driven by pulse width modulation type currents that modulate output pressure proportionally according to the controlled width of step pulses of current applied to the driver. While the frequency of the pulses remains substantially the same, the pulse widths are changed to modulate the valves.

The hydrostatic system is preferably a closed loop fluid power system that consists of a charge pump (not shown), and the variable displacement pump 30, which is driven by a flex plate/dampener assembly (not shown) connected to the engine flywheel. The charge pump provides pressurized fluid to the proportional valve inlets 107,119. Return fluid from the servo control unit is routed to the reservoir of the tractor's hydraulic system.

An exemplary example of a control valve, such as the control valve 106, is illustrated in FIG. 3A. The solenoid 106a includes a plunger 120 (shown schematically) driven by the solenoid coil 121 (shown schematically). The plunger 120 drives a valve spool 122 within a housing 123. The housing provides the pressurized hydraulic fluid inlet 107, in the form of plural openings, and an outlet 124, in the form of plural openings, to the hydraulic fluid reservoir. A control pressure outlet 125 communicates hydraulic fluid at a modulated pressure to the servo cylinder 114 as shown in FIG. 2. The solenoid coil 121 drives the plunger 120 downward (in FIG. 3A) to open the inlet 107 to the outlet 125 through an annular channel 122a.

The channel 122a is open to an oblong orifice 122b through the spool 122 to communicate fluid into an interior 122c of the spool. The interior of the spool is open to the outlet 125. The pressure of the hydraulic fluid at the control outlet 125 is substantially proportional to the force applied to the spool by the plunger, ranging between reservoir pressure, the pressure at the outlet 125 with the inlet 107 closed, as shown in FIG. 3A, to pressurized hydraulic fluid supply pressure, the spool 122 moved down to close the outlet 124 and open the inlet 107.

An annular screen 107a and a circular screen 125a can be supplied to the inlet 107 and to the outlet 125 respectively.

The control valve 108 can be identically configured as described above for the control valve 106.

Figure 4:
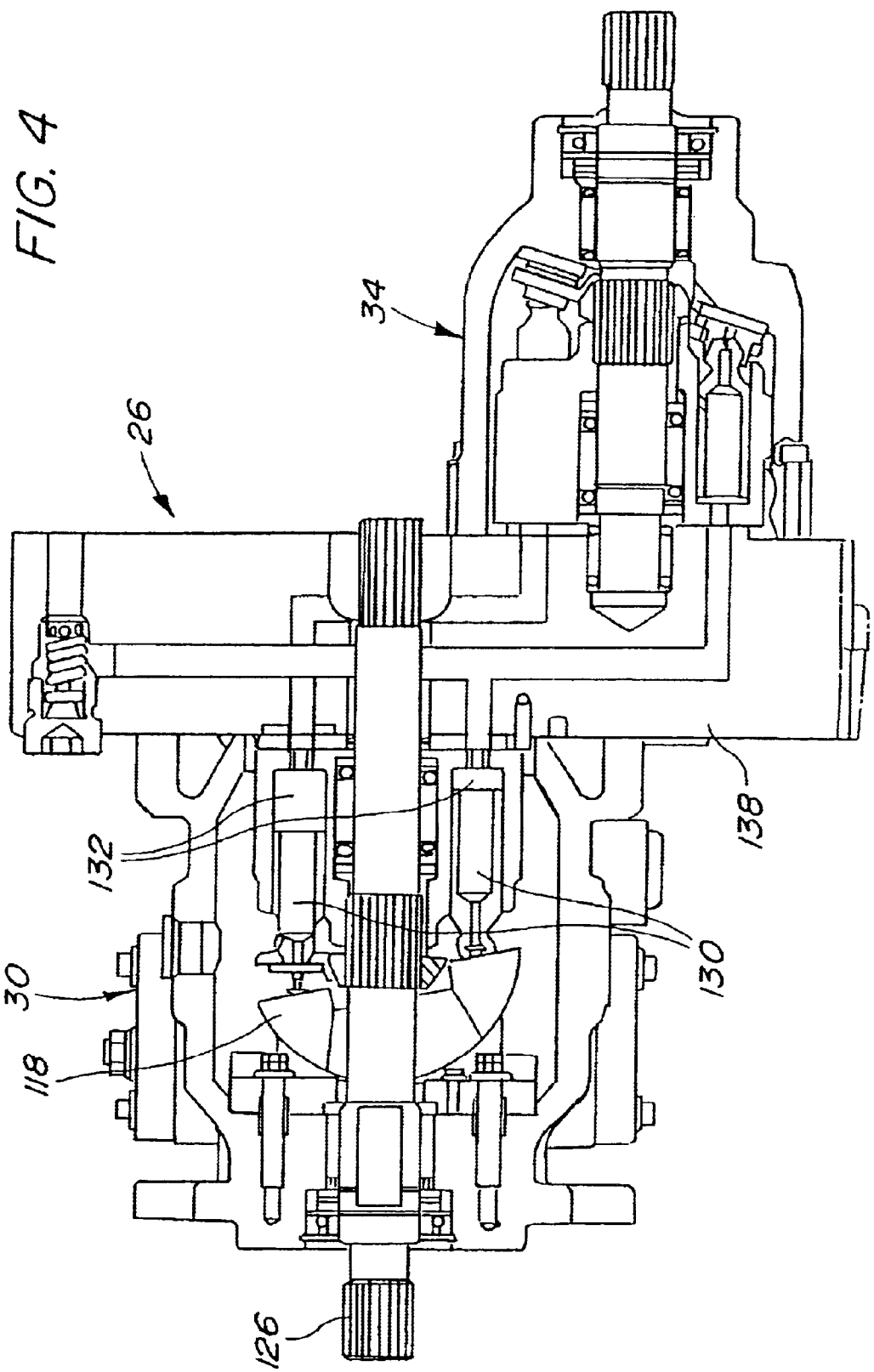
FIG. 4 is a schematic sectional view of a hydrostatic transmission.

FIG. 4 illustrates the hydrostatic transmission 26 in more detail. The hydrostatic pump 30 illustrated is an axial piston, servo controlled, variable displacement piston pump. Input shaft splines 126 are driven via a flex plate (not shown) bolted onto the engine flywheel (not shown).

Fluid flow through the pump 30 is controlled by changing the angle of the swashplate 118. The location, off center, of the swashplate controls the distance the pistons 130 travel inside the piston bores 132 of the rotating assembly. The direction that the swashplate is rotated from center determines the direction of fluid flow, forward or reverse. The number of degrees the swashplate is deflected determines how much fluid will be displaced which controls transmission speed.

The hydrostatic pump 30 provides hydraulic fluid to the hydrostatic motor 34 through the back plate 138. Hydraulic fluid in the power train circulates in a closed loop. Fluid leaves the hydrostatic pump 30, flows through the hydrostatic motor 34, and is returned to the hydrostatic pump. Fluid that leaves this closed loop circuit, such as to the case drain, is replenished by fluid from the charge pump.

The hydrostatic motor 34 is a high torque axial piston motor. The motor is located on the rear of the back plate. The hydrostatic motor drives an output shaft coupled to the range transmission 27 that transfers power to the wheels. The range transmission 27 can be a multi-speed range gear transmission, such as a three-speed or four-speed gearbox.

Figure 5:
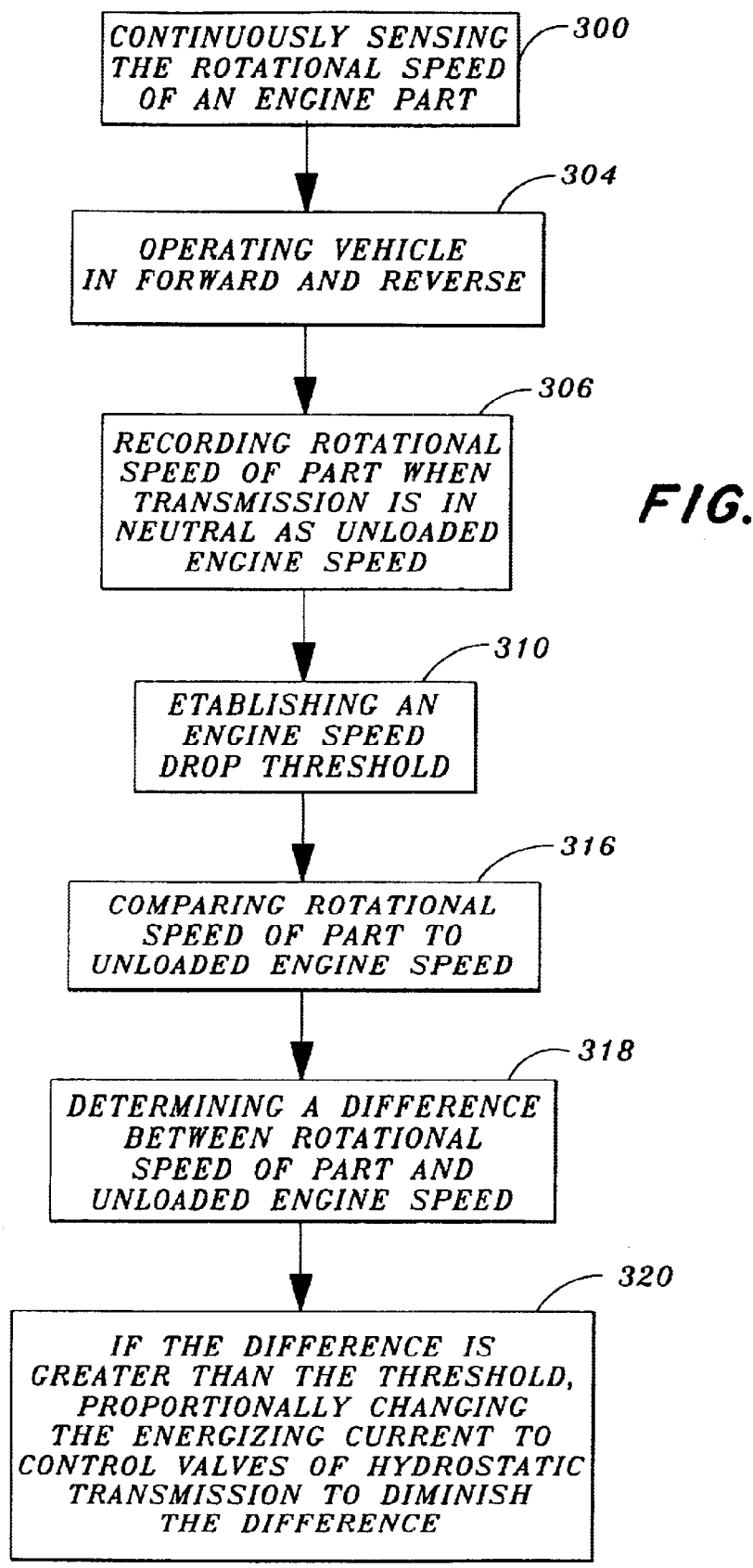
FIG. 5 is a block diagram of the speed control algorithm steps of the present invention.

A method of preventing engine stall in a utility vehicle is set forth in FIG. 5. The method includes the steps of: step 300, continuously sensing the rotational speed of a rotating part in an engine of the vehicle; step 304, operating the vehicle in forward and reverse; step 306, recording the rotational speed of the part when the transmission is in neutral as the unloaded engine speed, or alternatively, continuously monitoring the position of the throttle lever; step 310, establishing a speed drop threshold; step 316, comparing the rotational speed of the part to the unloaded engine speed; step 318, determining a difference between the unloaded engine speed and the speed of the part; step 320, whenever the engine speed drops below the threshold, proportionally reducing the energizing current to the proportional control valves to reduce hydrostatic transmission output, to unload the engine.

The unloaded engine speed can be determined by the throttle lever position sensor 56 or alternatively by recording the engine speed each time the transmission passes through the neutral position, i.e., neither forward nor reverse pedals being depressed and the vehicle being stationary. The threshold engine drop amount can be a preselected amount or can be calculated based on a percentage of the engine unloaded speed.

Figure 6:
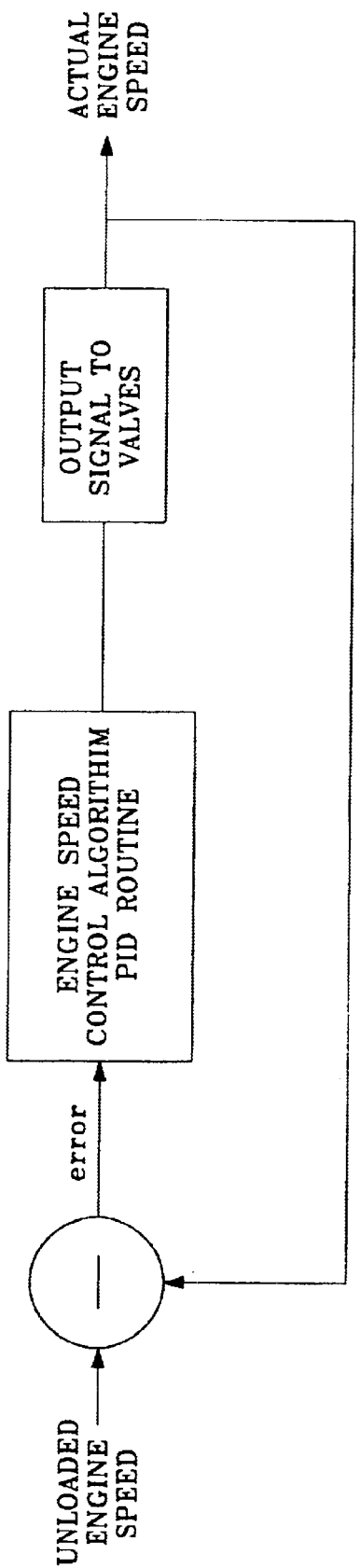
FIG. 6 is a block diagram of an engine speed control algorithm routine incorporated into the present invention.

FIG. 6 illustrates a control algorithm routine of the software of the microcontroller 52 which compares the engine speed as sensed by the Hall effect pickup unit 64 to the unloaded engine speed, which uses PID (proportional, integral, derivative) feedback control mathematics to diminish the difference by controlling the speed output of the hydrostatic transmission. The routine changes the output signal from the microcontroller to the proportional control valves proportionally, to reduce or increase the hydrostatic transmission speed output.

Figure 7:
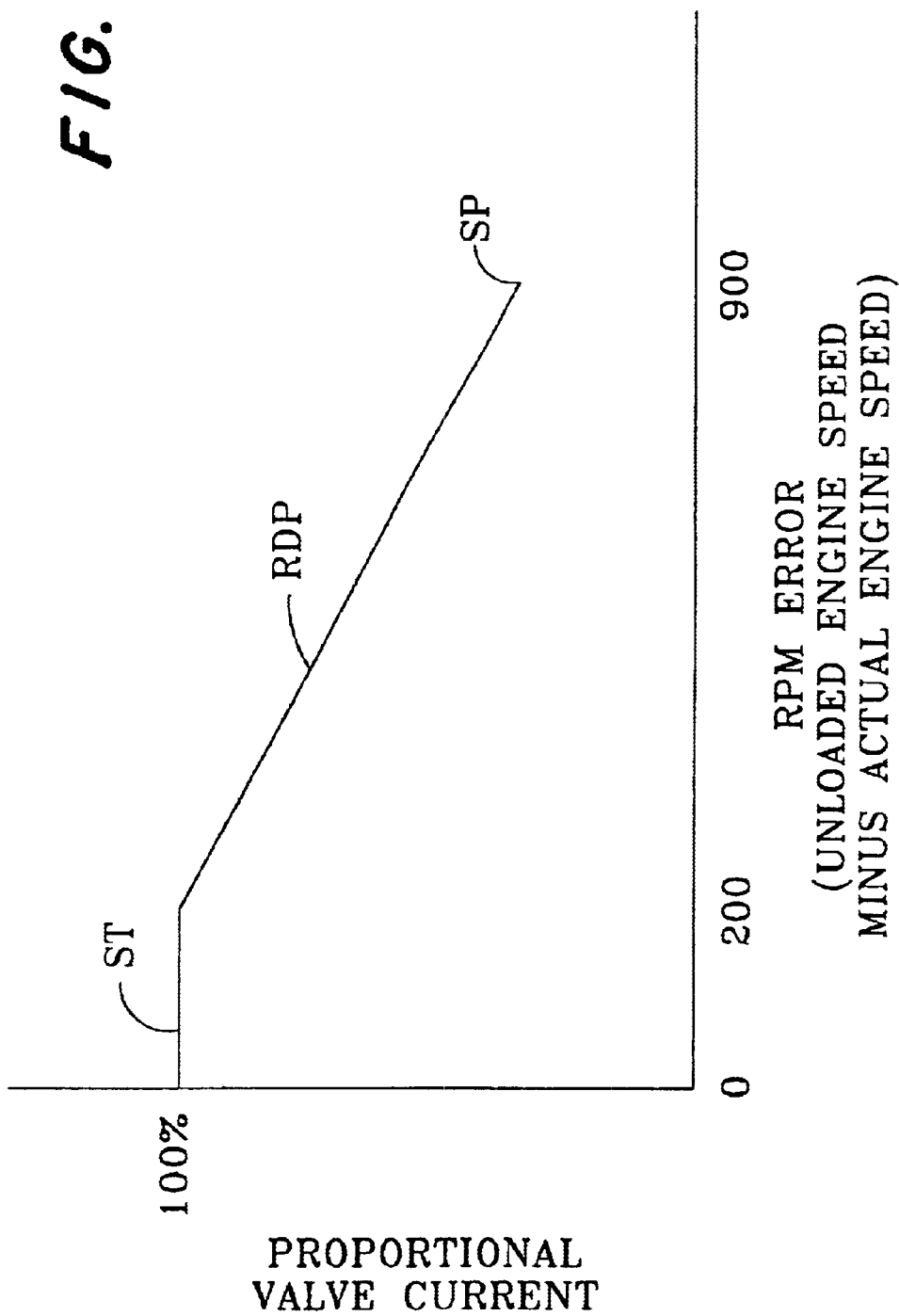
FIG. 7 is a proportional valve control diagram demonstrating the operation of the present invention.

FIG. 7 illustrates the proportional relationship between the engine speed drops and the proportional valve current signal from the microcontroller. The speed drop is defined as the unloaded actual engine speed minus the actual measured engine speed. To operate effectively, some engine speed drop under load is necessary. This is indicated as a speed drop threshold ST. In the example shown in FIG. 7, the engine speed can drop 200 rpm before the proportional control valve current from the microcontroller is changed. After the threshold ST is reached, further drop in engine rpm decreases the proportional valve current substantially linearly during a ramp down phase RDP until, at a certain engine speed drop, no further current reduction is required to prevent engine stalling.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An engine control system for a compact utility tractor having an engine coupled to a hydrostatic transmission, that is coupled to a driven wheel, comprising:
    a controller;
    an engine speed sensor, signal-connected to said controller to send an actual engine speed signal to said controller;
    a speed control actuator having at least a forward and a neutral position, said speed control actuator causing speed command signals from said controller to adjust said hydrostatic transmission speed output to said wheel;
    said controller having circuitry that continuously monitors engine speed and the position of said control actuator;
    said controller having circuitry that records said engine speed at the occurrence of said neutral position of said speed control actuator as an unloaded engine speed; and
    when the engine speed signal decreases under load by a specified amount below said unloaded engine speed, said controller having circuitry that sends a control command to said hydrostatic transmission to reduce tractor speed proportional to the difference between said unloaded engine speed and said actual engine speed signal.

2. The engine control system according to claim 1, wherein the engine comprises a flywheel and said engine speed sensor comprises a Hall effect pickup sensor arranged adjacent to the flywheel to sense pulses of rotating teeth of the flywheel.

3. The engine control system according to claim 1, comprising forward and reverse proportional control valves signal-connected to said controller, and a servo piston mechanically connected to said swashplate, said forward and reverse proportional control valves operable to relatively pressurized one side of said servo piston to move said servo piston and cause corresponding movement of said swashplate.

4. The engine control system according to claim 1, comprising a neutral position switch and said controller includes a memory, said memory for instantaneously recording said engine speed signal upon switch actuation of said neutral position switch.

5. The engine control system according to claim 1, wherein said speed control actuator comprises forward and reverse pedals each having a position sensor signal-connected to said controller.

6. A method of controlling an engine transmission system of a utility tractor, wherein the engine throttle remains substantially stationary in the transmission is controlled by a speed actuator to adjust speed, the speed actuator having at least a forward and a neutral position, comprising the steps of:

continuously monitoring engine speed;

sensing for the neutral position of said speed actuator;

at the neutral position of said speed actuator, recording the engine speed as an unloaded engine speed;

during a forward drive of the vehicle, when the engine speed drops by a preselected amount below said unloaded engine speed, commence decreasing ground speed of said vehicle proportionally to amount of engine speed drop below unloaded engine speed, to increase engine speed.

7. The method according to claim 6, wherein said speed actuator further comprises a reverse position, and said step of recording the engine speed is further defined in that said neutral position is sensed between movement from the forward to reverse positions of said actuator.

8. The method according to claim 6, wherein said step of recording the engine speed is further defined in that said unloaded engine speed is assigned a new recorded value each time the speed actuator is positioned in the neutral position.

9. A method of controlling the speed of a utility vehicle, said vehicle having an engine driving a hydrostatic transmission, said hydrostatic transmission driving a drive train, said drive train arranged to drive a driven wheel, comprising the steps of:

continuously sensing the rotational speed of the engine;

operating said vehicle in forward and reverse;

sensing the rotational speed of the engine between forward and reverse as an unloaded set speed and saving said unloaded set speed in memory;

thereafter, if the rotational speed of the engine differs from the unloaded set speed, changing the hydrostatic transmission output to diminish the difference.

10. The method according to claim 9, wherein the hydrostatic transmission includes a variable displacement pump, said variable displacement pump including a swashplate which can be angularly adjusted to adjust hydrostatic transmission output, and a proportional control valve signal-actuated to adjust swashplate angle, wherein the step of changing the hydrostatic transmission output is further defined by the step of changing a driving signal to the proportional control valve to change the angle of the swashplate in the variable displacement pump of the hydrostatic transmission.

11. The method according to claim 9, comprising the further step of: providing as an unloaded engine set speed, a set speed estimated from a throttle lever position sensor.

* * * * *